United States Patent
Miyata et al.

[11] Patent Number: 6,166,883
[45] Date of Patent: Dec. 26, 2000

[54] SPRING ASSEMBLY FOR BIASING SHUTTER OF A DISK CASSETTE

[75] Inventors: Kiyoyuki Miyata; Shintaro Higuchi, both of Miyagi, Japan

[73] Assignee: Sony Corporation, Tokyo, Japan

[21] Appl. No.: 09/132,389

[22] Filed: Aug. 11, 1998

[30] Foreign Application Priority Data

Aug. 13, 1997 [JP] Japan .................................. 9-218795

[51] Int. Cl.⁷ .................................................. G11B 23/03
[52] U.S. Cl. ............................................ 360/133; 369/291
[58] Field of Search .............................. 360/133; 369/291

[56] References Cited

U.S. PATENT DOCUMENTS

| | | | |
|---|---|---|---|
| 4,470,083 | 9/1984 | Doering et al. | 360/133 X |
| 4,559,575 | 12/1985 | Noto et al. | 360/133 |
| 5,515,358 | 5/1996 | Goto | 369/291 |
| 5,777,982 | 7/1998 | Koshiyouji | 369/291 |
| 5,793,742 | 8/1998 | Sandell et al. | 369/291 |

*Primary Examiner*—William R. Korzuch
*Attorney, Agent, or Firm*—Frommer Lawrence & Haug, LLP.; William S. Frommer; Matthew K. Ryan

[57] ABSTRACT

A disk cassette including a cassette housing having upper and lower shells in which a freely rotatable disc is accommodated. A shutter is slidably secured in parallel relation to the side surfaces of the cassette housing and opens/closes a head insertion hole formed in the cassette housing. The disk cassette further includes a shutter spring assembly which has one end thereof hooked to the cassette housing and the other end thereof hooked to the shutter and thereby urges the shutter so as to close the head insertion hole. An insertion groove is provided in the cassette housing for inserting the shutter spring assembly thereinto and be covered by the shutter when the shutter closes the head insertion hole.

1 Claim, 12 Drawing Sheets

SPRING ASSEMBLY FOR BIASING SHUTTER OF A DISK CASSETTE

BACKGROUND OF THE INVENTION

The present invention relates to a disk cassette containing a disk having information recorded therein.

An information recording medium for a computer, such as a magnetic disk, a magnetooptical disk, an optical disk or the like is accommodated in a disk cassette in consideration of disk protection, etc.

FIG. 1 is an exploded perspective view showing a disk cassette in which a magnetic disc is accommodated.

The disk cassette 10 is fabricated as follows. Prescribed mechanical parts are installed in upper and lower shells 12 and 13 constituting a cassette housing 11 of the disk cassette 10 by a lifter installing process, liners 14 and 15 obtained by perforating unwoven cloth in a circular shape are attached to the shells 12 and 13 by a liner installing process, and then a disk 16 which is completed through a sheet fabricating process is sandwiched between the upper and lower shells 12 and 13 through the liners 14 and 15 by a write protector installing process and a disk installing process. Thereafter, the upper and lower shells 12 and 13 are fused and integrated into the cassette housing 11 by an ultrasonic welding process, and a shutter 17 is secured through a shutter spring 18 to the cassette housing 11 so as to be slidable in parallel to the side surfaces of the cassette housing 11 and open/close a head insertion hole 11a formed in the cassette housing 11.

The shutter spring 18 is a torsion spring serving as urging means which urges the shutter 17 to perform an open/close operation. The shutter spring 18 is hooked to the cassette housing 11 at one end of one arm thereof while hooked to the shutter 17 at one end of the other arm thereof, whereby it urges the shutter 17 so as to close the head insertion hole 11a.

When the shutter 17 and the shutter spring 18 are installed into the cassette housing 11, the shutter 17 is first mounted on the outside surfaces of the cassette housing 11, and then the shutter spring 18 is inserted into the cassette housing 11 from a shutter spring insertion groove 11b provided to the cassette housing 11 and secured to the cassette housing 11.

That is, as shown in FIG. 3A, after the shutter 17 is inserted into the cassette housing 11, the shutter spring 18 is moved in a direction as indicated by an arrow a while one end of one arm portion 18a of the shutter spring 18 is held by an insertion jig, and one end of the other arm portion 18b of the shutter spring 18 is inserted from the shutter spring insertion groove 11b along a spring guide notched portion 12a into the cassette housing 11 and hooked thereto.

Subsequently, as shown in FIG. 3B, one arm portion 18a of the shutter spring 18 is pushed in a direction as indicated by an arrow b to insert the shutter spring 18 from the shutter spring groove 11b into the cassette housing 11. At this time, as shown in FIG. 3C, one end of one arm portion 18a of the shutter spring 18 is detached from the insertion jig, opened in a direction as indicated by an arrow c, and then hooked to a spring hook portion 17a, thereby completing the installing process.

When the disk cassette 10 thus constructed is in nonuse, the head insertion hole 11a is closed by the shutter 17 to protect the disk 16. On the other hand, when the disk cassette 10 is in use, the head insertion hole 11a is opened by the shutter 17 to partially expose the disk 16 and record/reproduce information in/from the disk 16.

Following the recent enhancement in recording density of disks as described above, it becomes more important to enhance hermeticity and rigidity of disk cassettes for the purpose of high-precision information recording/reproduction for disks and stable running of the disks. However, a portion of the shutter spring insertion groove 11b of the conventional disk cassette 10 which is not covered by the shutter 17 is open, and thus the hermeticity of the disk cassette 10 is reduced. As a result, there is a problem that dust invades into the cassette housing 11.

Further, the shutter spring insertion groove 11b is formed at the substantially same length as one side of the cassette housing 11. Therefore, the thickness of the cassette housing 11 at that portion is smaller, and the rigidity of the disk cassette 10 is reduced. As a result, there are problems that the cassette housing 11 is distorted, resulting in disturbance of stable running of the disk 16, and that the shutter 17 falls out when the disk cassette 10 falls down by mistake.

SUMMARY OF THE INVENTION

The present invention has been implemented in view of the above situation, and has an object to provide a disk cassette having high hermeticity and rigidity.

In order to attain the above object, according to the present invention, a disk cassette including a cassette housing comprising upper and lower shells in which a disc is freely rotatably accommodated, a shutter which is slidably secured in parallel to the side surfaces of the cassette housing and opens/closes a head insertion hole formed in the cassette housing, and urging means which has one end thereof hooked to the cassette housing and the other end thereof hooked to the shutter, and urges the shutter so as to close the head insertion hole, wherein an insertion groove for inserting the urging means into the cassette housing is provided to the cassette housing so as to be covered by the shutter which is urged so as to close the head insertion hole.

According the disk cassette thus constructed, the insertion groove of the urging means is formed so as to have such a length that the insertion groove is covered by the shutter, thereby enhancing hermeticity and rigidity of the disk cassette.

DETAILED DESCRIPTION OF THE PREFERRED EMBODIMENTS

A preferred embodiment according to the present invention will be described with reference to the accompanying drawings.

The following description is made on an embodiment to which the present invention is suitably applied, and thus various preferable limitations are imposed on the embodiment. However, the scope of the present invention is not limited to the following embodiment unless any special description on the limitation of the present invention is made in the following description.

Figure 4:
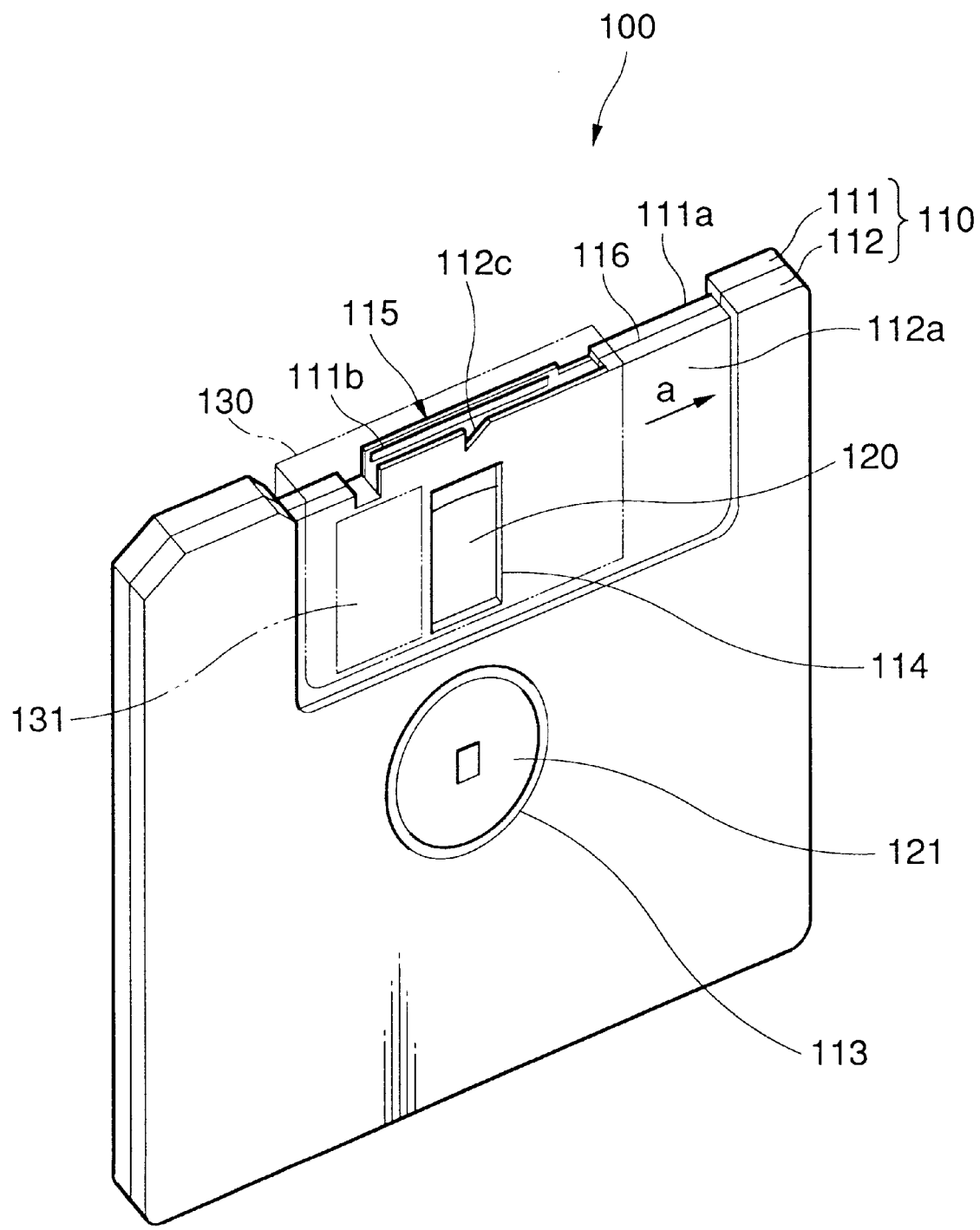
FIG. 4 is a perspective view showing an embodiment of a disk cassette according to the present invention.

FIG. 4 is a schematic diagram showing an embodiment of a disk cassette according to the present invention, and FIGS. 5 to 7 are detailed diagrams of the main parts thereof.

A cassette housing 110 of a disk cassette 100 of FIG. 4 comprises an upper shell 111 and a lower shell 112, and a disk 120 is freely rotatably accommodated therebetween.

The disk 120 has a metal center core 121, and the center core 121 is chucked to a spindle of a disk driver through a center hole 113 formed in the lower shell 112.

Figure 1:
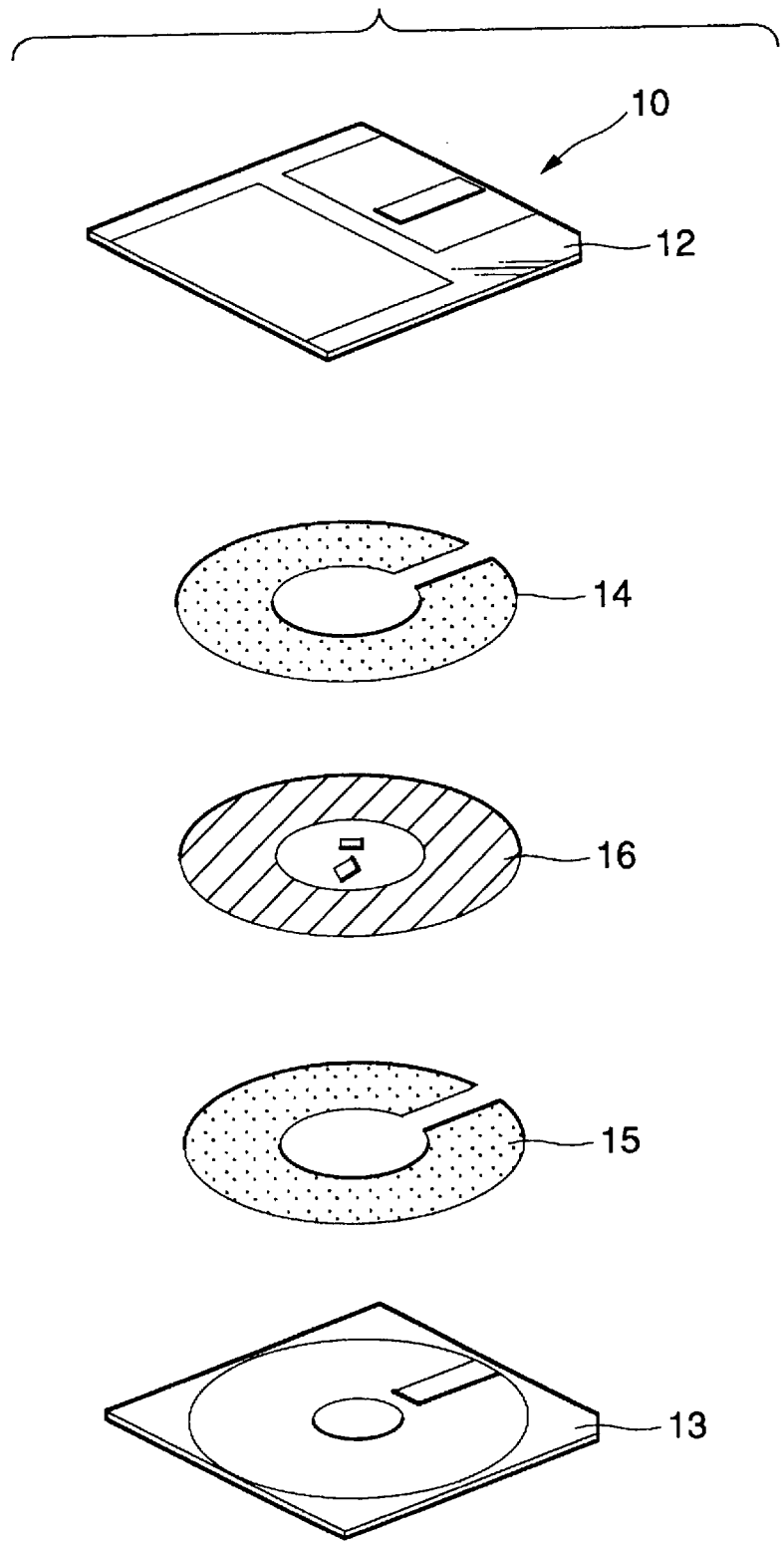
FIG. 1 is an exploded perspective view showing a disk cassette.
Figure 2:
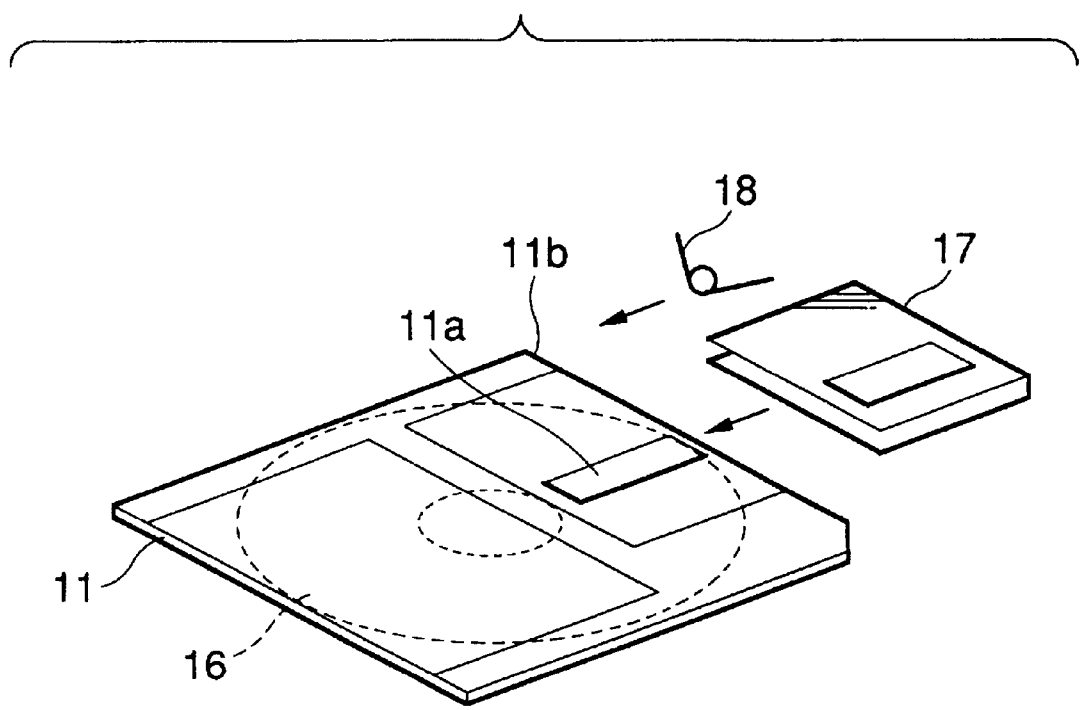
FIG. 2 is a perspective view showing a final fabrication process of the disk cassette of FIG. 1.

A rectangular lower head insertion hole 114 is formed in the lower shell 112 so as to elongate along the radial direction of the disk, and an upper head insertion hole is also formed at the corresponding position of the upper shell 111. Further, a shutter 130 (as indicated by a one-dotted chain line in order to clarify the internal structure of the cassette housing 110 in FIG. 1) for opening/closing the lower head insertion hole 114 and the upper head insertion hole is slidably mounted on recess portions 111a and 112a formed in the upper and lower shells 111 and 112 respectively so as to be hooked astride the cassette housing 110.

Figure 5A:
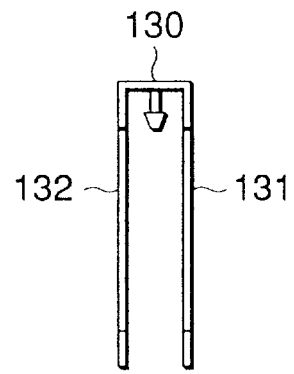
FIGS. 5A and 5B are a plan view and a side view showing a first main part of the disk cassette of FIG. 4.
Figure 5B:
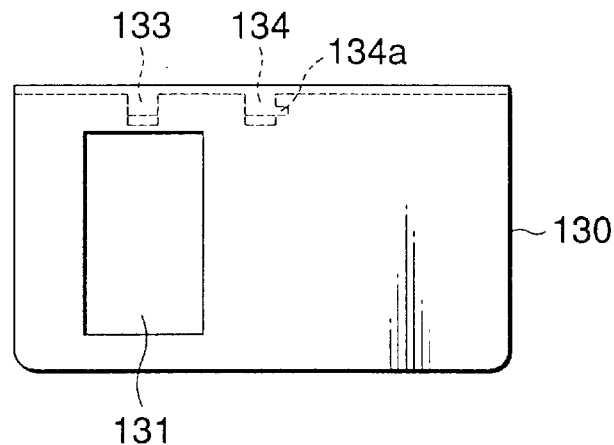

As shown in FIG. 4 and FIGS. 5A and 5B, window holes 131 and 132 which are confronted to the lower head insertion hole 114 and the upper head insertion hole are formed in both the surfaces of the shutter 130. When the shutter 130 is located at a closing position shown in FIG. 4, the lower head insertion hole 114 and the upper head insertion hole are displaced from the window holes 131 and 132 to be kept in a close position. On the other hand, when the shutter 130 is moved in the direction of an arrow a of FIG. 4 and located at an opening position, the lower head insertion hole 114 and the upper head insertion hole are overlapped with the window holes 131 and 132 respectively to be kept in an open position, thereby allowing a lower head and an upper head to be inserted through the lower head insertion hole 114 and the upper head insertion hole.

Further, two projecting portions 133 and 134 for guiding the movement of the shutter 130 are provided at the upper portion of the inner surface of the shutter 130 as shown in FIG. 5B. One projecting portion 134 is provided with a spring hook portion 134a to which one end of a shutter spring 140 serving as urging means for moving the shutter 130 of FIGS. 6A and 6B to the opening/closing position is hooked.

Figure 7A:
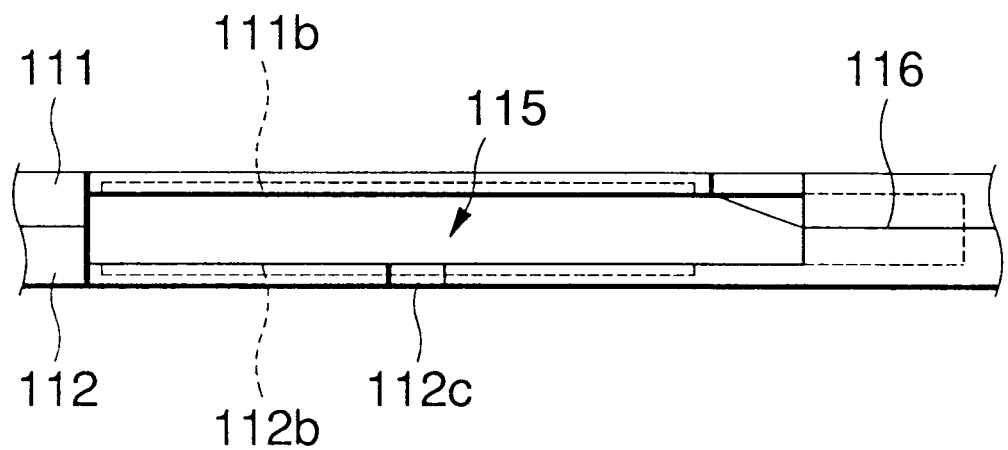
FIGS. 7A and 7B are a plan view and side view showing a third main part of the disk cassette of FIG. 1.
Figure 7B:
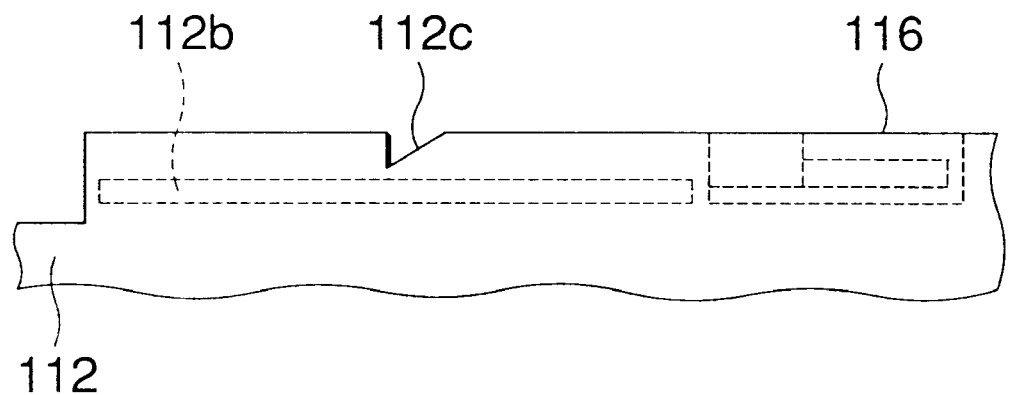

The projecting portions 133 and 134 are engagedly inserted into guide grooves 111b and 112b formed in the inner surfaces of the upper shell 111 and the lower shell 112 respectively, which form a shutter spring insertion groove 115 of the cassette housing 110 shown in FIG. 4 and FIGS. 7A and 7B, thereby guiding the movement of the shutter 130.

Figure 6A:
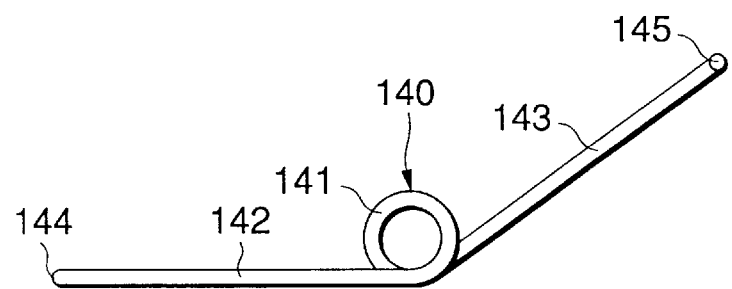
FIGS. 6A and 6B are a plan view and a side view showing a second main part of the disk cassette of FIG. 4.
Figure 6B:
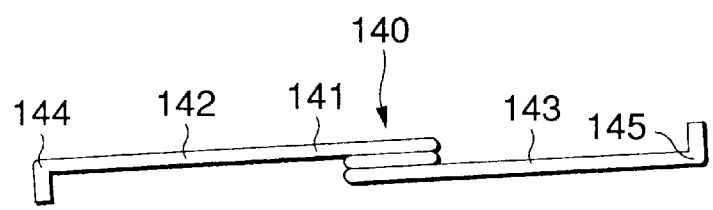

As shown in FIGS. 6A and 6B, the shutter spring 140 is a torsion spring obtained by turning a stainless wire rod at several times, for example. Both ends of the coil portion 141 form arm portions 142 and 143 which are linearly extended. The end portions of the arm portions 142 and 143 are bent by substantially 90 degrees with respect to the arm portions 142 and 143 so as to extend in the height direction of the coil portion 141 and in the opposite directions to each other, thereby forming bent portions 144 and 145.

One bent portion 144 (145) is hooked to the cassette housing 110 and the other bent portion 145 (144) is hooked to the spring hook portion 134a, thereby urging the shutter 130 to close the lower head insertion hole 114.

The arm portions 142 and 143 are designed to have the same length and the bent portions 144 and 145 are designed to have the same length, so that any one of the bent portions 144 and 145 may be hooked to the cassette housing 110 or the spring hook portion 134a of the shutter 130. That is, the mount of the shutter spring 140 has no directivity, and thus it can be remarkably easy to perform the fabrication work by hands or an automatic machine. Further, since the bent portions 144 and 145 extend in the height direction of the coil portion 141, the height of the shutter spring 140 in the thickness direction of the disk cassette 100 can be more greatly reduced, and this is suitable for a thin type cassette structure.

Next, the structure of the cassette housing 110 to which the shutter 130 is mounted will be described.

Figure 3A:
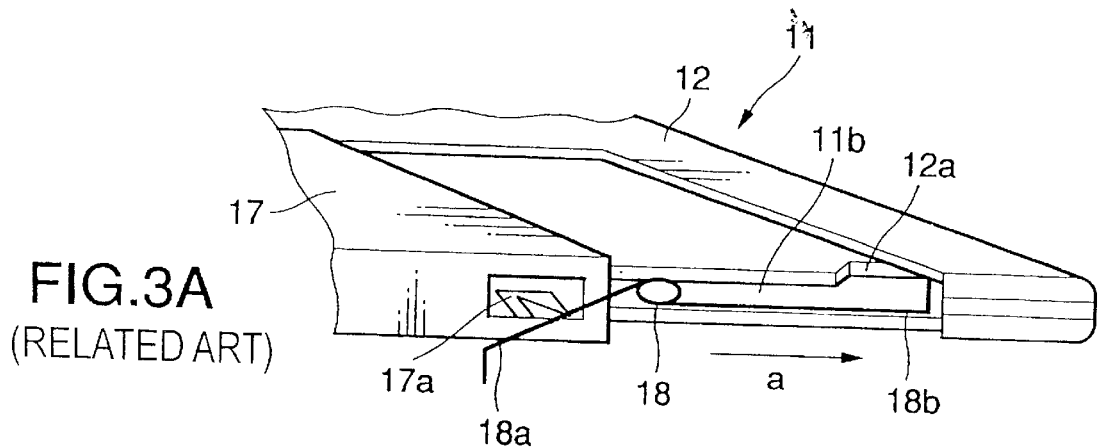
FIGS. 3A to 3C are perspective views showing a fabrication process of the main part of the disk cassette of FIG. 1.
Figure 3B:
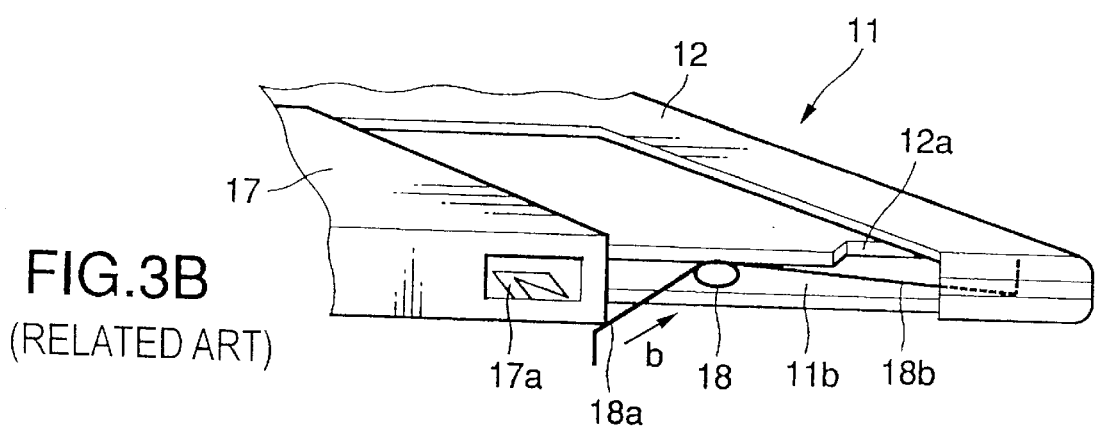
Figure 3C:
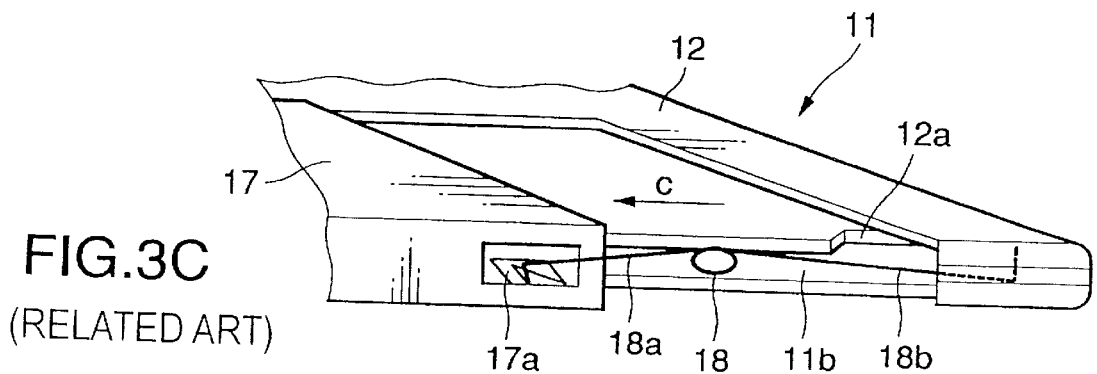

In the conventional disk cassette 10, a part of the shutter spring insertion groove 11b, that is, a portion which is not covered by the shutter 17 is opened as shown in FIG. 3C in the state where the shutter 17 is urged to close the head insertion hole 11a. However, in the disk cassette 100 of this embodiment, the shutter spring insertion hole 115 is designed to be covered by the shutter 130 in the state where the shutter 130 is urged to close the head insertion hole 114 as show in FIG. 4. That is, the upper shell 111 and the lower shell 112 constituting the peripheral edge portion 116 of the cassette housing 110 through which the shutter 130 passes when it moves to open the lower head insertion hole 114 are closed as shown in FIG. 4 and FIGS. 7A and 7B.

Further, a spring temporary fixing groove 112c serving as a temporary fixing portion to facilitate the mounting work of the shutter spring 140 is formed at the lower shell 112 side on the shutter spring insertion groove 115. The spring temporary fixing groove 112c is required to be prevented from interfering against the shutter spring 140 after the shutter spring 140 is finally hooked to the spring hook portion 134a of the shutter 130, and in order to satisfy this requirement, the spring temporary fixing groove 112c is formed out of the movable range of the spring hook portion 134a in the state where the shutter 130 is urged to close the lower head insertion hole 114 (specifically, in the case of FIG. 8B, the spring temporary fixing groove 112c is formed at a more left-hand side than the spring hook portion 134a when the shutter 130 is leftwardly moved and located at the left limit position in FIG. 8B).

Figure 8A:
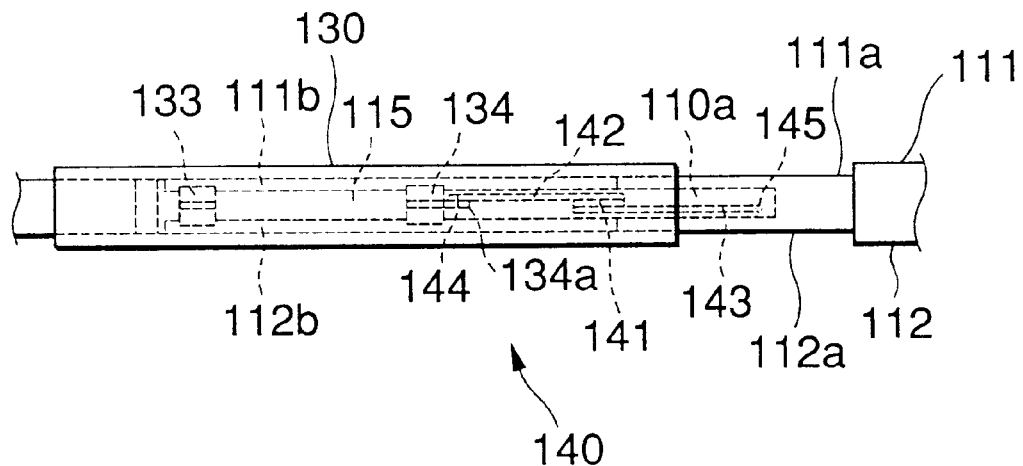
FIGS. 8A and 8B are first plan and side views showing the fabricated construction of the main parts of the disk cassette shown in FIGS. 4A to 7B.
Figure 8B:
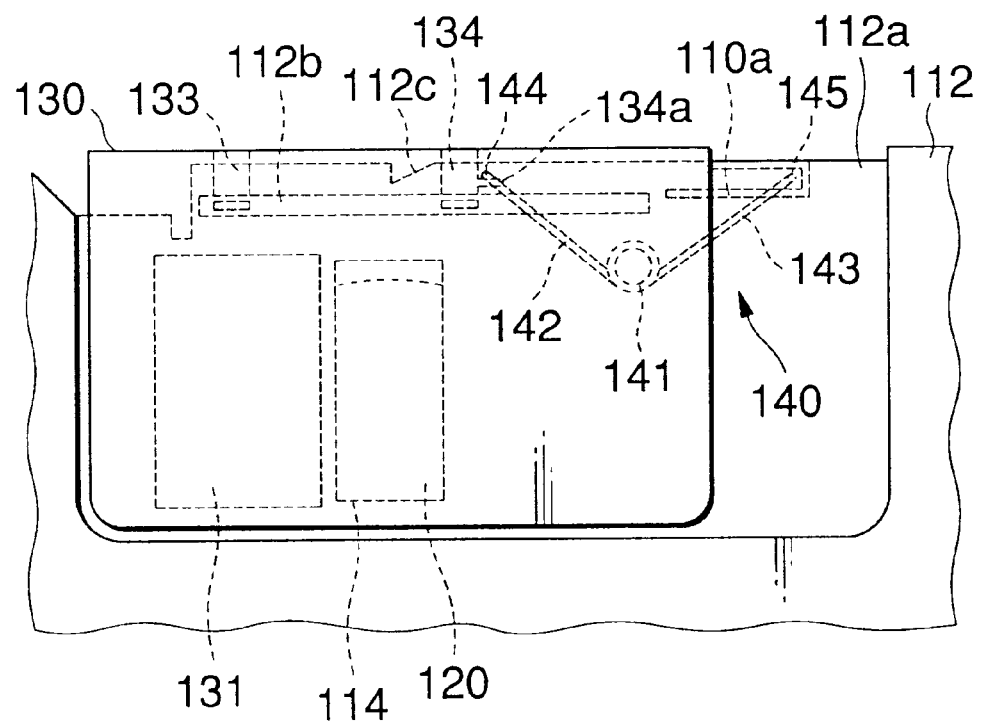
Figure 9A:
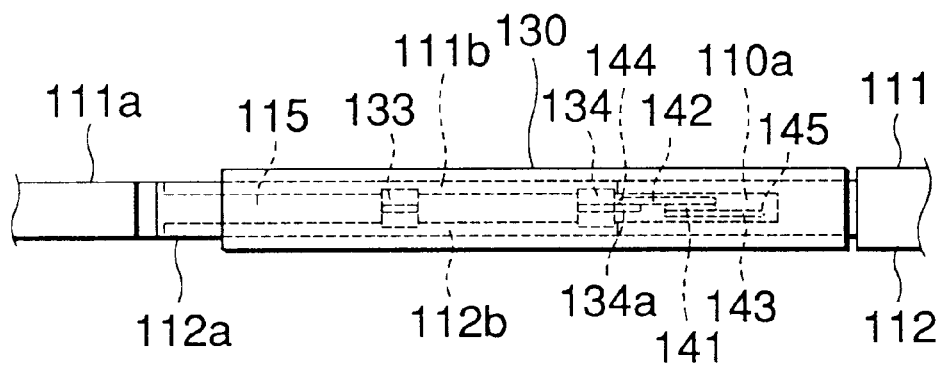
FIGS. 9A and 9B are second plan and side views showing the fabricated construction of the main parts of the disk cassette shown in FIGS. 4A to 7B.
Figure 9B:
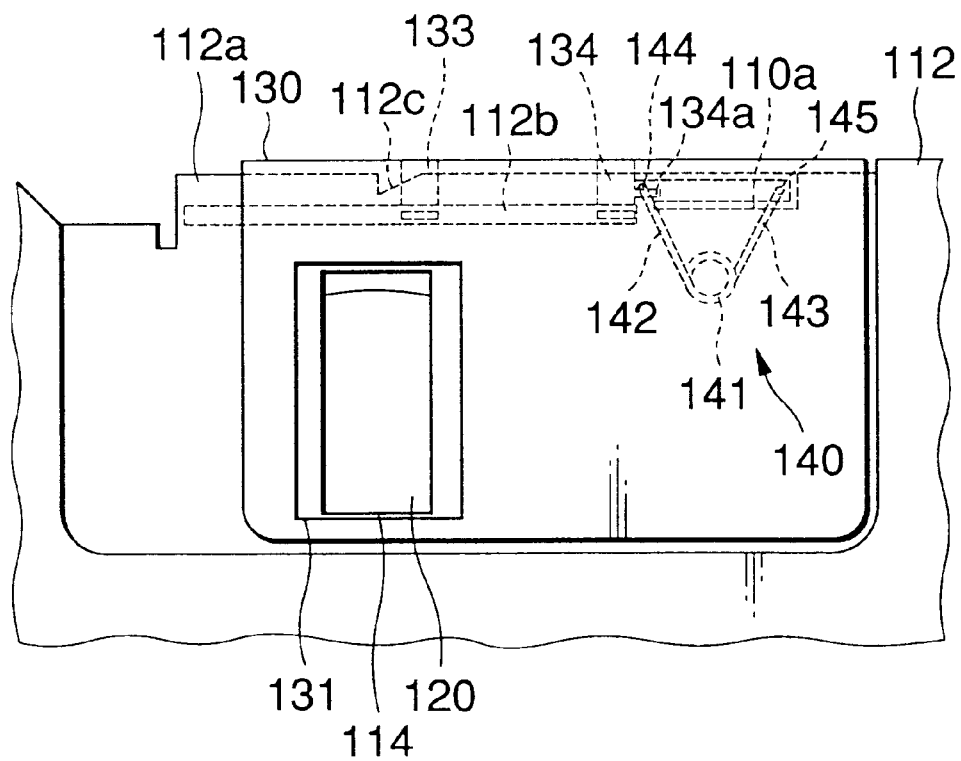

FIGS. 8A and 8B show a situation where the shutter 130 and the shutter spring 140 are mounted on the cassette housing 110 and the shutter 130 is moved to close the lower head insertion hole 114, and FIGS. 9A and 9B show a situation where the shutter 130 is moved to open the lower head insertion hole 114.

The projecting portions 133, 134 of the shutter 130 are engagedly inserted in the guide grooves 111b and 112b formed in the inner surfaces of the upper shell 111 and the lower shell 112 respectively, and the shutter 130 is slidably mounted on the recess portions 111a and 112a formed on the upper shell 111 and the lower shell 112, respectively.

The bent portion 145 of one arm portion 143 of the shutter spring 140 is hooked to the spring hook portion 110a formed in the cassette housing 110, and the bent portion 144 of the other arm portion 142 is hooked to the spring hook portion 134a of the shutter 130.

When the disk cassette 100 is in non-use, the shutter 130 is urged to close the lower head insertion hole 114 by the elastic force of the shutter spring 140. When the disk cassette 100 is in use, the shutter 130 is urged to open the lower head insertion hole 114 by the force of a disk drive mechanical portion which elastically deforms the shutter spring 140. Accordingly, when the disk cassette 100 is released from the disk drive mechanical portion, the shutter 130 is automatically urged to close the lower head insertion hole 114 by the restoration force of the shutter spring 140.

When the shutter 130 and the shutter spring 140 are installed into the cassette housing 110, the shutter spring 140 is first pushed from the shutter spring insertion groove 115 formed in the cassette housing 110 into the cassette housing 110 to be mounted in the cassette housing 110, and then the shutter 130 is mounted on the outer surfaces of the cassette housing 110.

Figure 10:
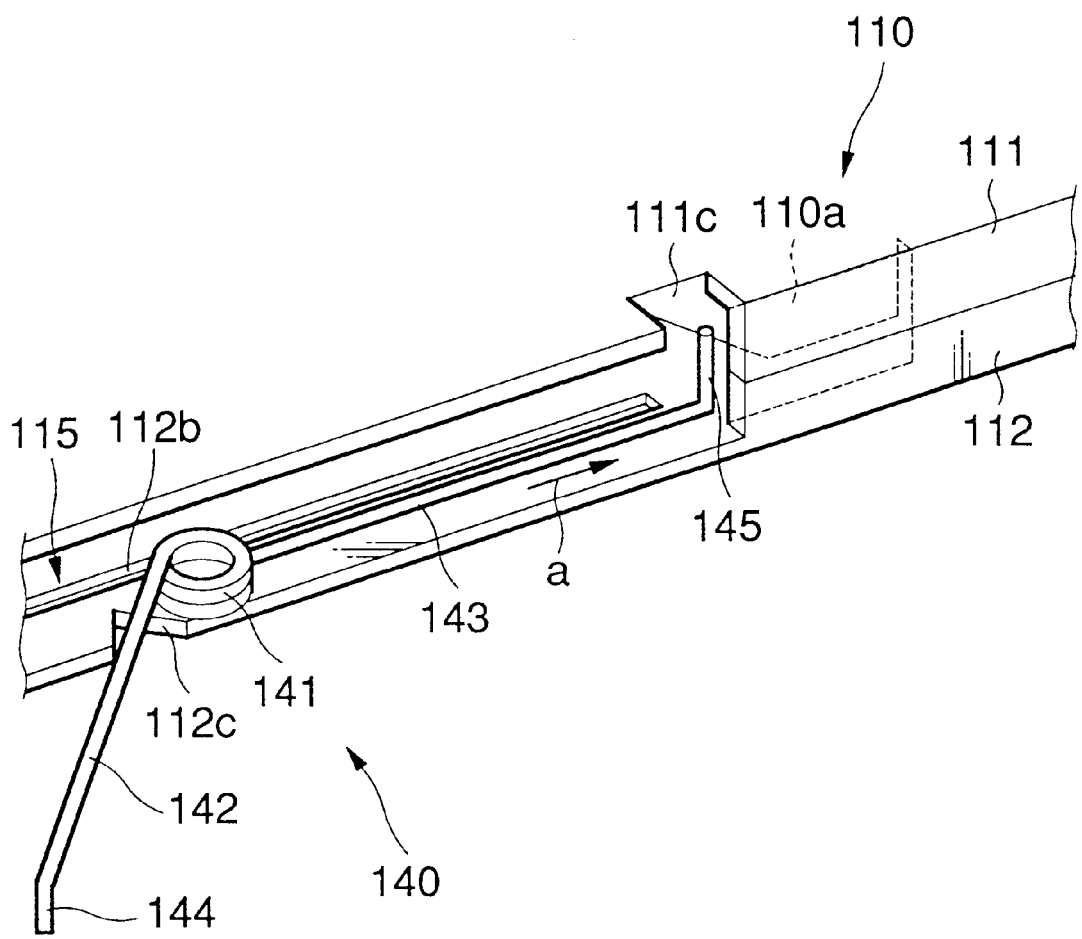
FIG. 10 is a first perspective view showing the fabrication process of the main parts of the disk cassettes shown in FIGS. 4A to 7B.

That is, as shown in FIG. 10, the shutter spring 140 is moved in the direction indicated by an arrow a by the shutter spring insertion groove 115, and the bent portion 145 of one arm portion 143 of the shutter spring 140 is inserted into the cassette housing 110 along the spring guide notched portion 111c formed on the upper shell 111, and hooked to the spring hook portion 110a.

Figure 11:
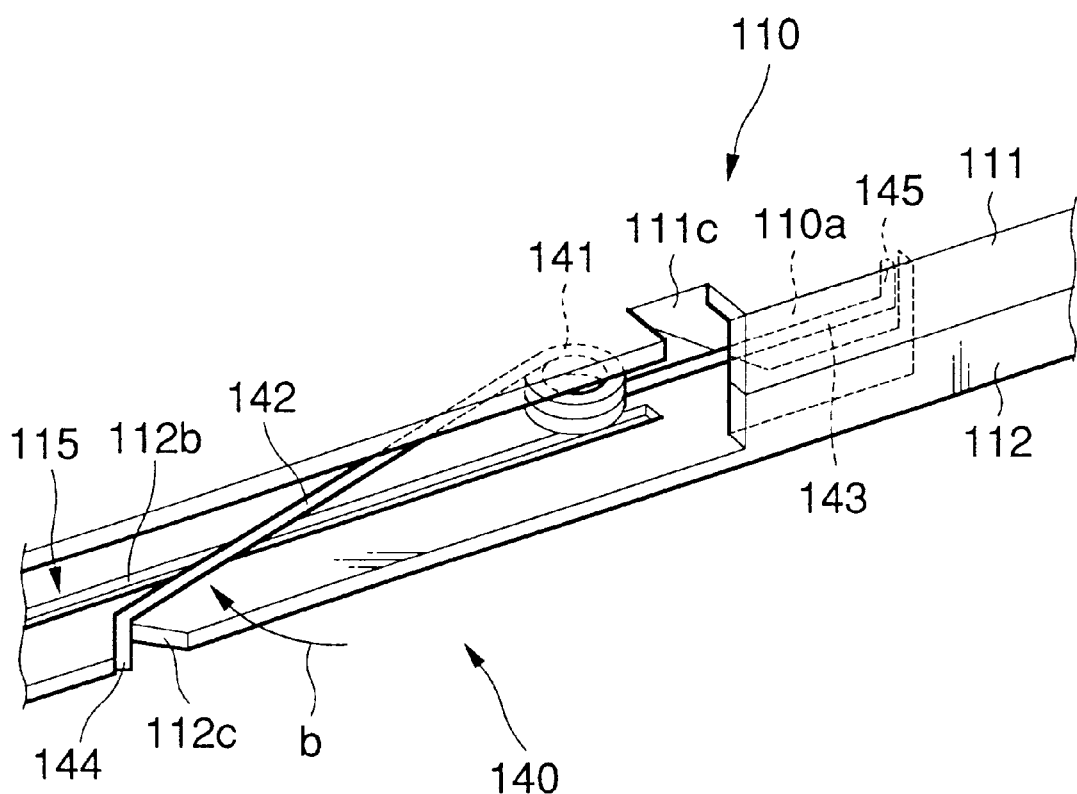
FIG. 11 is a second perspective view showing the fabrication process of the main parts of the disk cassette shown in FIGS. 4A to 7B.

Subsequently, as shown in FIG. 11, the other arm portion 142 of the shutter spring 140 is pushed in the direction indicated by an arrow b to insert the shutter spring 140 from the shutter spring insertion groove 115 into the cassette housing 110, and the bent portion 144 of the other arm portion 142 of the shutter spring 140 is hooked to the spring temporary fixing groove 112c.

Figure 12:
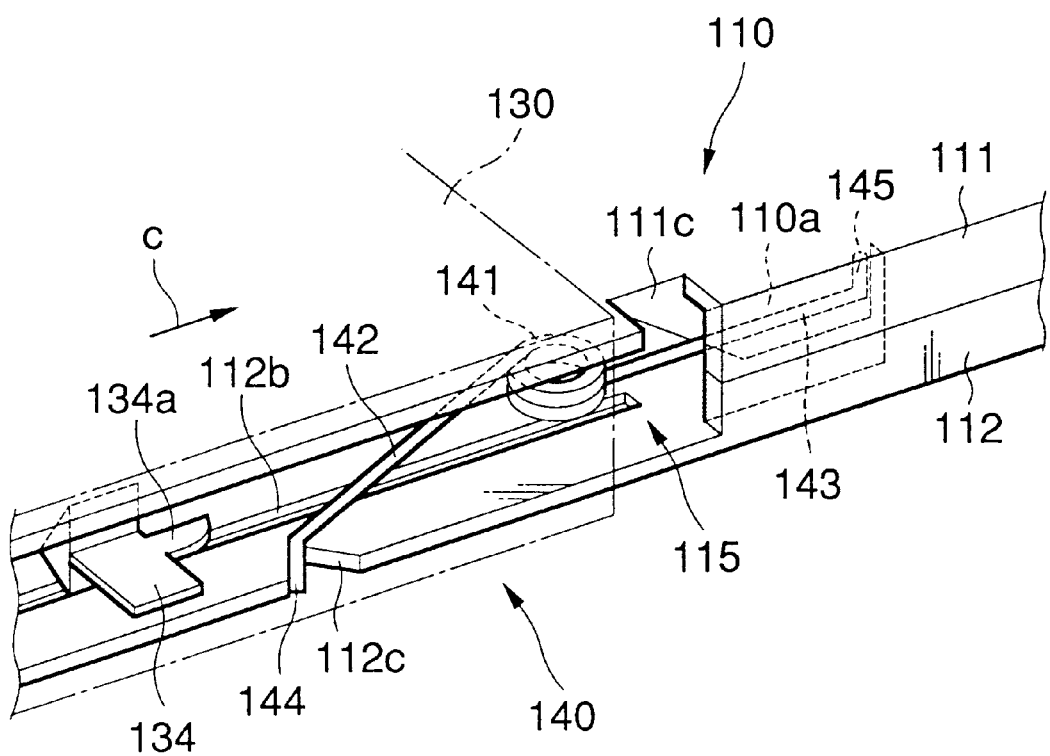
FIG. 12 is a third perspective view showing the fabrication process of the main parts of the disk cassette shown in FIGS. 4A to 7B.
Figure 13:
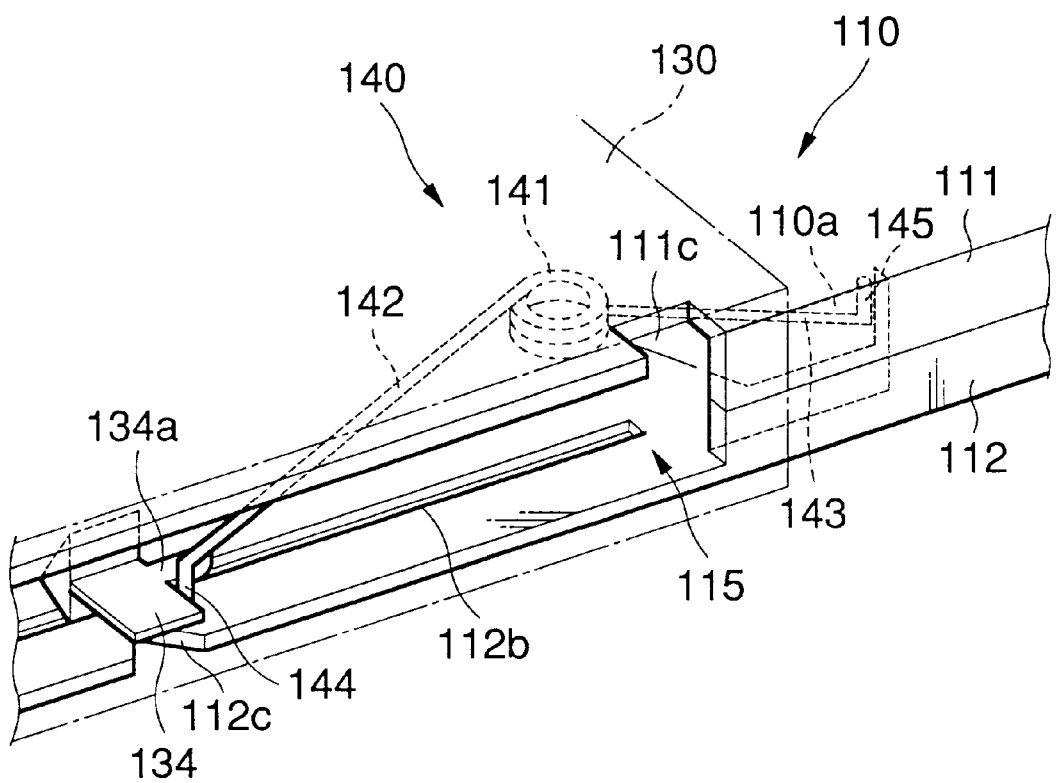
FIG. 13 is a fourth perspective view showing the fabrication process of the main parts of the disk cassette shown in FIGS. 4A to 7B.

Subsequently, as shown in FIG. 12, the shutter 130 is inserted into the cassette housing 110, and the projecting portions 133 and 134 are engagedly inserted into the guide grooves 111b and 112b of the upper shell 111 and the lower shell 112. The shutter 130 is moved in the direction indicated by an arrow c, whereby the bent portion 144 of the other arm portion 142 of the shutter spring 140 is detached from the spring temporary fixing groove 112c and hooked to the spring hook portion 134a as shown in FIG. 13, thereby completing the fabrication process of the disk cassette.

As described above, the shutter spring 140 can be easily installed, so that the workability of the manufacturing equipment can be enhanced and the fraction defective can be reduced.

As described above, according to the present invention, the insertion groove of the urging means is designed to have such a length that it can be covered by the shutter, and thus the hermeticity and rigidity of the disk cassette can be enhanced, and dust can be prevented from invading into the cassette housing. In addition, the stable running of the disk can be achieved, and also the shutter can be prevented from falling out when the disk cassette falls down by mistake.

What is claimed is:

1. A disk cassette including:
   a cassette housing comprising upper and lower shells in which a freely rotatable disc is accommodated;
   a shutter which is slidably mounted in parallel relation to side surfaces of said cassette housing and opens/closes a head insertion hole formed in said cassette housing;
   urging means for urging said shutter to close said head insertion hole and which has one end thereof hooked to said cassette housing and the other end thereof hooked to said shutter;
   an insertion groove is provided in said cassette housing for inserting said urging means into said cassette housing so as to be covered by said shutter when said shutter is urged so as to close said head insertion hole; and
   a temporary fixing portion for temporarily fixing the other end of said urging means before fixing the other end of said urging means to said shutter.

\* \* \* \* \*